United States Patent [19]

Leibinger et al.

[11] 4,345,744

[45] Aug. 24, 1982

[54] WORKING MACHINE WITH FLAME CUTTER AND COOLING UNIT

[75] Inventors: Berthold Leibinger, Gerlingen; Hans Klingel, Möglingen, both of Fed. Rep. of Germany

[73] Assignee: Trumpf GmbH & Co., Ditzingen, Fed. Rep. of Germany

[21] Appl. No.: 274,375

[22] Filed: Jun. 17, 1981

[30] Foreign Application Priority Data

May 11, 1980 [DE] Fed. Rep. of Germany ....... 3041621
Aug. 30, 1980 [DE] Fed. Rep. of Germany ....... 3032729

[51] Int. Cl.³ ............................ B23K 7/00; B23K 7/10
[52] U.S. Cl. .................................................. 266/49
[58] Field of Search ...................... 266/49, 48, 72, 73

[56] References Cited

U.S. PATENT DOCUMENTS

| | | | |
|---|---|---|---|
| 3,354,002 | 11/1967 | Gingerich et al. | 266/49 |
| 3,486,744 | 12/1969 | Beyers et al. | 266/49 |
| 4,143,860 | 3/1979 | Herbener et al. | 266/49 |
| 4,260,433 | 4/1981 | Johansson et al. | 266/49 |

Primary Examiner—W. Stallard
Attorney, Agent, or Firm—McGlew and Tuttle

[57] ABSTRACT

A machine is disclosed for working or machining flat workpieces which comprises, a frame, a flame cutter connected to the frame for directing a cutting flame or jet to one side of a workpiece which penetrates the workpiece, a mechanism for moving the workpiece past the jet and a cooling unit for receiving the flame after it has penetrated the workpiece. The cooling equipment includes an opening space for receiving the flame and a device for circulating coolant into the opening space so that the coolant can cool the flame and absorb particles, vapors and gases generated by the cutting operation.

43 Claims, 7 Drawing Figures

WORKING MACHINE WITH FLAME CUTTER AND COOLING UNIT

FIELD AND BACKGROUND OF THE INVENTION

The present invention relates in general to machines for working or machining flat workpieces, such as metal sheets, and in particular to a new and useful machine for working flat workpieces which includes a cooling unit for receiving a cutting frame that cuts the workpieces.

Such working machines are generally known. If they are equipped with a plasma jet cutter, they operate in a so-called dry plasma process. The disadvantage of this working method is a noisy operation and contamination of the ambient air with the produced heat, vapors, dust and combustion residues.

SUMMARY OF THE INVENTION

The present invention is directed to a working machine equipped with a flame cutter as mentioned above, in which the contamination of the ambient air is reduced.

Accordingly, an object of the present invention is to provide a machine for working flat workpieces comprising, a frame, a flame cutter connected to the frame for directing a cutting flame to one side of a workpiece which penetrates the workpiece, a mechanism connected to the frame for moving the workpiece passed the cutting flame, and cooling equipment connected to the frame having an opening space facing the flame cutter for receiving the flame which has penetrated the workpiece, and having means for circulating a coolant in the opening space so that the coolant can receive the flame plus any vapors or gases produced by the cutting operation to cool these products and also to reduce the noise level of the cutting operation. The flame cutter includes a cutting jet nozzle which emits the flame.

In such a working machine the cutting jet nozzle or the like is mounted above the workpiece, for example, and the cooling equipment is provided close beneath the workpiece, within the range of the jet so that the cutting jet, upon piercing the workpiece made of metal for example, immediately penetrates into the coolant. A suitable coolant is water, for example, to which additives may be admixed. Cooling emulsions and other non-combustible liquids may be used. The vapors, gases and combustion residues produced during the fusion of the workpiece in the cutting area, are thus introduced into the coolant along with the heat and, since the coolant circulates continuously at that location, these substances are instantly carried away. The circulation of the coolant, size and shape of the entrance openings for the cutting jet, and pressure and flow velocity of the coolant must be such as to prevent the coolant, at least substantially, from escaping through the jet entrance opening, and to insure that all gases and entrained particles are carried away. Therefore, advantageously, the entrance opening will be reduced to a diameter not substantially exceeding the cross-section of the jet in this area and will be located at a minimum distance from the workpiece. It may be understood from the foregoing, that the primary purpose of the cooling equipment is not to cool the workpiece, but to absorb or receive the hot jet and the entrained gaseous and liquid particles and to cool and carry away the constituents thereof.

Another object of the invention is to provide such a machine wherein the cooling equipment includes inner and outer concentric tubes having a central entrance opening forming the opening space for receiving the flame, the means for circulating coolant comprising means for feeding the coolant into an annular space between the inner and outer tubes and through the opening space.

In this design, the ends facing the workpiece of the concentric tubes are so disposed relative to each other that the coolant supplied through the inner tube, or the angular space formed between the inner and outer tubes, can easily return through the annular space or the inner tube, respectively.

According to another feature of the invention, the machine includes a pump for forcing coolant either into the annular space between the inner and outer tubes or into the opening space, and a suction device for drawing liquid out of the respective other one of the annular space and the opening space for drawing the liquid coolant out. This substantially accelerates the circulation of the liquid and at least substantially prevent an escape of the coolant through the entrance opening provided for the cutting jet.

A further object of the invention is to provide such a machine wherein the outer tube includes a radially inwardly extending flange which extends over a free end of the inner tube, a diameter of an opening defined by the flange substantially corresponding to the inside diameter of the inner tube. The liquid flow is thereby deflected in the transient zone between the annular space and the inside of the inner tube and tends to return only through the inner tube, not to escape from the outer tube through the entrance opening. The flow conditions are then advantageously improved by providing that the inside contour of the outer tube at an end thereof adjacent the workpiece is curved into an arc, particularly an approximately semicircular arc, and that the free end of the inner tube is rounded into an arc to form a deflecting gap between the inner and outer tubes in the area of the opening. In this way a curved, particularly an approximately semicircularly curved, annular gap is formed between the tube ends facing each other, through which the coolant enters the inner tube. To further improve the flow, it may be provided that the free end of the inner tube is slightly flared outwardly.

A still further object of the invention is to provide such a device wherein at least one of the two concentric tubes is mounted for displacement in an axial direction. This makes it possible to vary the width of the annular gap through which the liquid flows into the inner tube, to control the flow thereof.

The cooling equipment or its entrance opening may be brought particularly close to the workpiece by providing that the front face of the outer tube extends perpendicularly to the tube axis and forms at least in part a support face for the workpiece. This has the further advantage that liquid, gases, vapors, and entrained particles cannot escape at that location in the radial direction, or that such an escape is reduced to a relatively small extent, and a particularly satisfactory efficiency is obtained.

Another object of the invention is to provide such a machine which includes a trough-like liquid channel provided concentrically surrounding the outer tube at least near the free end thereof, which is covered by a workpiece and which includes an inlet and an outlet for receiving and discharging coolant to and from the liquid channel. While it is advisable to keep the cooling equipment, including the two concentric tubes, spaced apart from the workpiece, so that the cooling equipment substantially only cools the penetrating jet and the entrained gases and particles, the liquid circulating through the concentrical liquid channels comes into direct contact with the workpiece. The primary purpose of this design, however, is not to provide cooling but to attenuate the noise. As is well known, flame cutting especially plasma jet cutting, is relatively noisy. The sound waves pass in radial directions between the cooling equipment, or the front side of the outer tube, and the adjacent workpiece surface to the outside even if the workpiece is in direct contact with the outer tube. However, if the outer tube is surrounded in the described manner by a ring of liquid, the liquid attenuates the noise quite considerably, so that in this direction, too, the noise, which may injuriously effect the operator is considerably reduced. In addition, the cooling liquid forms a lubricating film facilitating the motion of the workpiece.

Another feature of the invention provides an inlet to the trough-like liquid channel which is in communication with the annular space formed between the inner and outer tubes for the passage of cooling liquid from the annular space into the liquid channel. Since the coolant is supplied through this annular space, a part thereof passes through the hydraulic connection to the circular liquid channel which is intended for noise attenuation. The specific design of this hydraulic connection is of secondary importance. What is substantial is to have the circular liquid channel permanently filled, without exposing it to a substantial pressure.

According to another feature of the invention, a third tube concentrically surrounds the outer tube and extends to form a portion of the trough-like liquid channel. This makes it possible to provide an annular channel between the third tube and the outer tube of the cooling equipment, which communicates through radial bores with the annular space formed between the inner and outer tubes and, particularly, is hydraulically connected through an annular gap to the liquid channel. This annular gap or flow passage may be formed by the front end facing the workpiece of the third tube, and the opposite surface of the workpiece. In this connection it is particularly advantageous to mount the third tube for axial displacement so that the width of this "overflow gap" may be adjusted as needed, and also varied during the operation.

Another object of the invention is to provide such a machine wherein a radially outer surface of the trough-like liquid channel includes a seal ring which is adapted to abut against a surface of the workpiece to form an annular sealing surface with the workpiece to close off the liquid channel. This seal ring of course must be resistant to the thermal and mechanical loads present. In particular, it must not be overlooked that the slit just cut by the jet next passes over a portion of the seal in the direction of the workpiece motion.

According to another feature of the invention the trough-like liquid channel is connected through at least one hydraulic line to a suction pump or liquid tank for discharging the coolant. The suction pump accelerates the circulation of the liquid through the trough-like liquid channel and thus prevents an undue heating thereof. If the flow paths are short and the flow resistance small, the trough-like liquid channel may also be connected directly, through one or more drain lines, to a liquid tank, without the interconnection of a suction pump.

A further object of the invention is to provide such a machine which, in addition to the flame cutter, includes a punching or nibbling device for mechanically working or machining the workpiece which is spaced laterally of the flame cutter.

The working machine may then be used not only for flame cutting but also for punching or nibbling, with the particular advantage of being able to cut contours and/or holes of any shape since the workpiece can be moved in its plane in any direction due to the longitudinal and transverse feed designed as a compound-type cross slide.

In the cooling equipment described thus far, the liquid coolant is circulated in such a way that the cutting jet, after piercing the workpiece, can immediately penetrate into the coolant to cool the entrained gases, particles, etc. Since the cutting jet causes the material of the workpiece to fuse, quite an amount of red-hot particles is entrained which cool down completely only during their travel through the cooling circuit. The cooling and taking away of the particles may be made more efficient by supplying the coolant under high pressure so that the circulation is accelerated, however, there are limits to such pressure increase for different reasons. On the other hand, if the red-hot particles are not removed quickly enough or only in an unsatisfactory manner, the risk is run that they will deposit in the zone of the entrance opening and impair the function of the cooling equipment.

Another feature of the invention is directed to an improvement of the above mentioned machine which permits better removal of the gases and particles of which the cutting jet is composed, by means of liquid coolant and to reduce deposits from the cutting jet in the zone of the entrance opening of the cooling equipment. To this end, the inventive machine includes means for producing a rotating liquid wall of coolant in the opening space. In the rotating liquid wall whose rotation is superposed with a downward motion due to the preferably vertical arrangement, the flow velocity is substantially higher, with reference to a definite rate of flow than with a purely axial, downward motion of the coolant. In addition, a certain centrifugal force acts on the rotating liquid wall, forcing the liquid to flow along a boundary surface and not to branch in an indefinite manner in the outlet line of the cooling equipment, without completely filling the cross sectional area thereof. Consequently, as desired, a more efficient absorption of the cutting jet and removal of the entrained solid particles as well as satisfactory protection against undesirable deposition of the red-hot particles, etc. is obtained since the liquid layer flowing along the tube wall is relatively dense.

In a working machine in which the cooling equipment in the zone of the entrance opening for the cutting jet comprises at least one tube, or a casing having its bore extending perpendicularly to the workpiece plane, a development of the invention provides that, in the zone of the entrance opening for the cutting jet or flame, at least one of the inner and outer tubes is formed into a casing having a bore extending transversely to the plane of the workpiece, with a port for supplying coolant extending through a wall of the casing and opening obliquely or tangentially into the bore, the port connected to means for delivering the cooling liquid to produce a circular rotation of the liquid in the bore. If the coolant is introduced in the zone of the entrance opening for the cutting jet, the longitudinal axis of the supply port may extend perpendicularly to that of the tube or casing, thus horizontally, for example. Also, not a single port but preferably a plurality of ports uniformly distributed over the circumference will be provided for supplying the coolant, to obtain a powerful rotary motion of the liquid wall.

According to a further object of the invention the machine which includes a circulating means for forming the rotating liquid coolant wall, includes an inwardly extending flange extending from the outer tube out over the inner tube to form a deflection gap, the outer tube comprising a casing having a bore extending therein for receiving the inner tube. If the annular space between the two tubes is closed at the lower end or designed to be closable, the cooling liquid which has entered the annular space flows upwardly and through the deflection gap into the interior of the inner tube. The tubular liquid wall keeps rotating at least to a large extent, so that within the inner tube, the cooling liquid flows downwardly along the inner surface thereof with a strong rotary motion.

In a working machine with a plurality of oblique supply passages, these passages advantageously lead from an annular channel connected by a coolant supply line. A single connecting line between the coolant supply tank and the cooling equipment is therefore needed. The coolant, after being purified, may be recycled into this tank.

Another feature of the invention provides, in the zone of the entrance opening for receiving the cutting jet, a drivable device for producing the rotation of the cooling liquid wall. The device may be designed as a wheel with guide surfaces, driven externally or by the liquid itself.

According to a further object of the invention, the machine includes, in the area of the cutting jet, two concentric tubes which extend approximately vertically and are spaced apart from each other, with the coolant being supplied through an annular space formed therebetween, means for deflecting the coolant near the ends of the tubes facing the workpiece, with means for rotating the inner tube to form the rotating liquid coolant wall. In this embodiment again, the guide plates or the rotatable device imparting rotary motion, serve the purpose of setting the coolant wall in rotation or to intensify this rotation, however, unlike the preceding varient of the invention, the cooling liquid must initially flow to the entrance opening for the cutting jet, where it is deflected preferably through 180°.

According to another feature of the invention, the cooling liquid is received in the interior of this casing and rises along the inner surface thereof as soon as the casing is set in rotation. By setting a suitable speed, the cooling liquid may be caused to rise close up to the rim of the casing, without overflowing, however. This saves a supply and discharge conduit for the coolant. On the other hand, the casing must be arranged so as to permit an emptying and cleaning operation, from time to time.

In instances where relatively much heat is produced and also solid particles are obtained from the plasma cutting process, it is particularly advantageous to provide that the inner tube is in the form of a rotatably mounted casing which is driven to rotate and form the rotating cooling liquid, the casing including a top inwardly extending rim located adjacent a zone where the flame cuts the workpiece, to retain the coolant in the casing. Then the cooling liquid may be allowed to flow over the rim of the casing and cooler liquid may be supplied to the casing through the bottom thereof.

If an uncontrolled flow of the cooling liquid over the rim of the casing is not desired, it is very advantageous, in accordance with a further development of the invention, to provide a tubular jacket spaced apart from and surrounding the drivable casing and having its bottom designed as an outlet or provided with an outlet connection. Especially in the last mentioned design, the tubular jacket will also be closed below by an at least annular bottom. The outlet connection is then provided on this bottom. A double walled jacket may also be provided, with the inner wall being slightly shorter, and an outer flange of the drivable casing engaging thereover. A seal between the drivable casing and the and the fixed jacket may thus be saved.

Still another object of the invention is to provide such a machine for working or machining flat workpieces which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

One embodiment of the invention is shown in the drawings in which.

DESCRIPTION OF THE PREFERRED EMBODIMENTS

Figure 1:
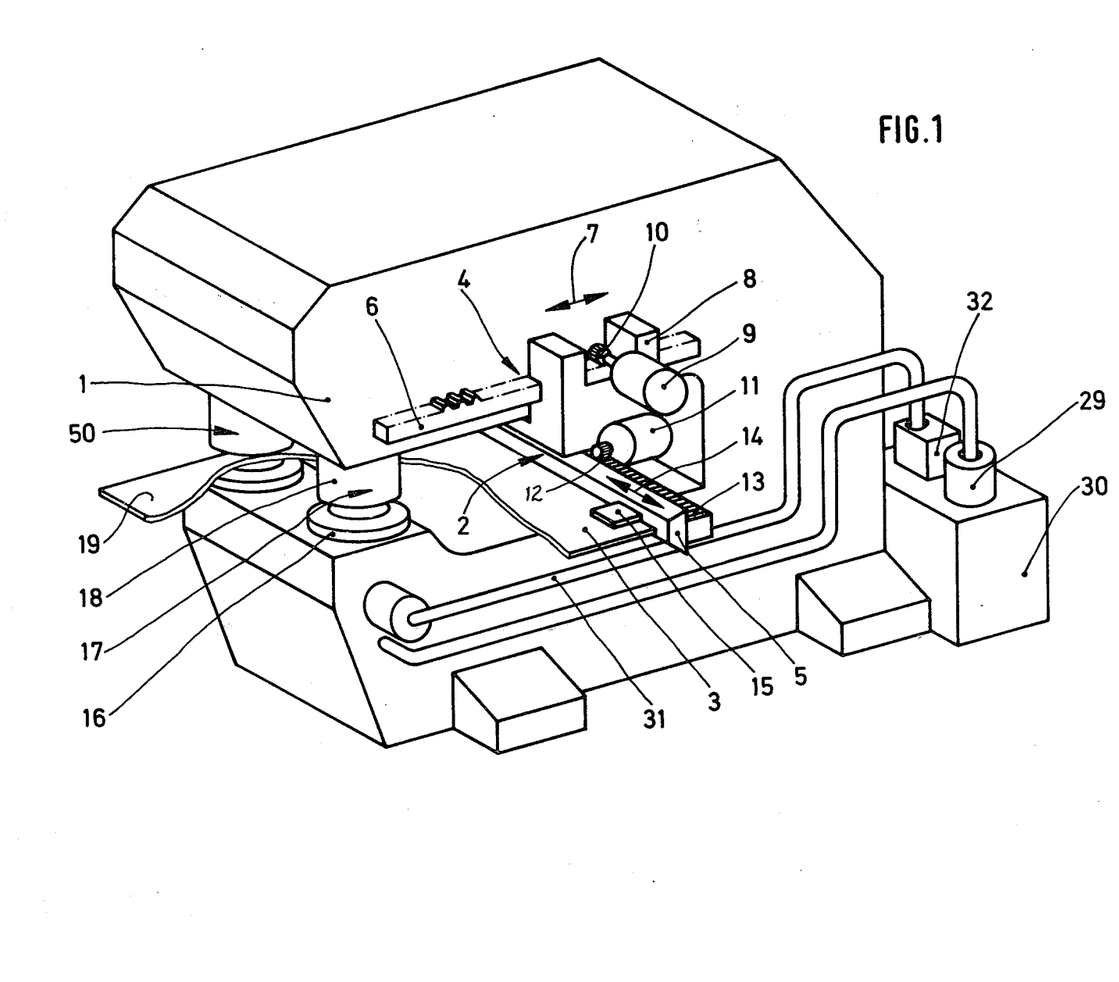
FIG. 1 is a perspective view of a machine according to the invention.

Turning to the drawings in particular, the invention embodied therein, in FIG 1, is a workpiece cutting and machining device which includes a coordinate guide workpiece moving unit, a flame cutting unit and a flame cooling unit.

The substantially C-shaped machine frame 1 supports a coordinate guiding unit or equipment 2 for a workpiece 3, which comprises a longitudinal guide mechanism 4 and a transverse guide mechanism 5. Longitudinal mechanism 4 includes a guide rail 6 fixed to machine frame 1, and a carriage 8 displaceable thereon in the direction of double arrow 7, preferably by means of a drive motor 9 which rotates a pinion 10. Pinion 10 meshes with teeth in guide rail 6 which is designed as a geared rack.

Carriage 8 carries a second motor 11 which drives pinion 12. Pinion 12 meshes with the teeth of a supporting rail 13 which also is designed, at least partly, as a geared rack or carries such a rack. Rail 13 is slidably mounted on frame 1. By means of motor 11, supporting rail 13 can be displaced in the direction of double arrow 14. The two directions of motion, 7 and 14, are perpendicular to each other.

Supporting rail 3 is preferably equipped with two pairs of claws 15 between which workpiece 3 is clamped and of which only one is shown in FIG. 1. It will be understood that the workpiece can be moved by means of drive motor 9 in the directions of arrow 7 and by means of drive motor 11 in the directions of arrow 14. With a simultaneous drive of both motors 9 and 11, a superposed longitudinal and transverse motion is obtained. Workpiece 3, in addition, rests on the lower part 16 of a flame cutter assembly 17. Assembly 17 is particularly a plasma jet cutter, whose upper part is shown at 18. Upper part 18 comprises a cutting jet nozzle through which a cutting jet is directed onto the upper surface 19 of workpiece 3, to fuse the material in this area and to penetrate through to the underside 20 of the workpiece, shown in FIGS. 2A and 2B.

Figure 2A:
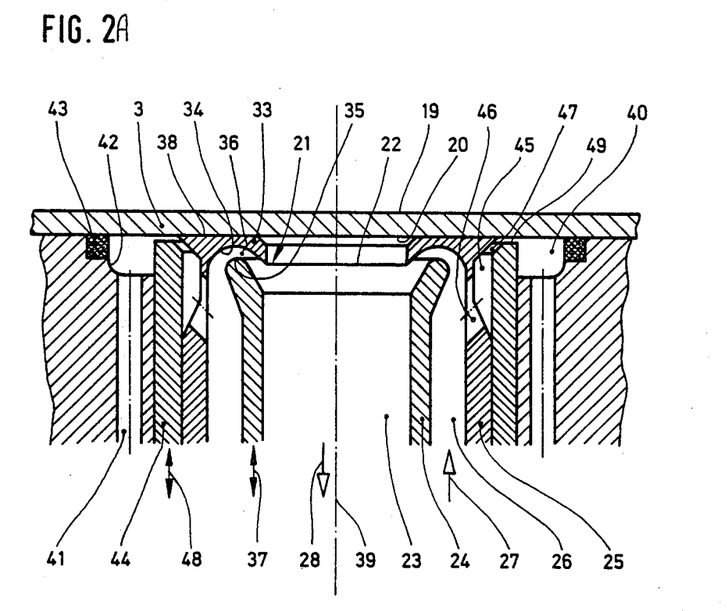
FIG. 2A is a partial radial sectional view taken in the zone of the cutting jet of the machine of FIG. 1.

At the workpiece side remote from the jet nozzle, i.e. at underside 20, cooling equipment 21 is provided with a controlled coolant circulation as shown in FIG. 2A. Cooling equipment 21 has an entrance opening 22 which is provided in alignment with the cutting jet nozzle or another element for directing the cutting jet, and through which the cutting jet penetrates into a coolant 23. The coolant, so to speak, swallows both the jet and the entrained gases, vapors, and particles produced in the burning process which are then carried away by the coolant. In the zone of entrance opening 22, the cooling equipment comprises two concentrically arranged tubes, an inner tube 24 and an outer tube 26. An annular space 26 is formed therebetween through which coolant 23 is supplied in the direction of arrow 27. In this design, the coolant then flows through inner tube 24 in the direction of arrow 28. The coolant is supplied into annular space 26 by means of a pump 29 (see FIG. 1). The pump takes the coolant by suction from a tank 30. Inner tube 24 is connected through a pipe 31 to a liquid suction device 32 which insures a fast return of the coolant into tank 30.

The free end of the outer tube 25, at the workpiece side, is formed with an inner flange 33 extending over the free end of inner tube 24 at this side. The inside diameters of inner flange 33 and inner tube 24 are approximately equal to each other, as shown in FIG. 2A. As also shown in the drawing, the inside contour of outer tube 25 or inner flange 33 is curved at this free end, the curved portion being indicated at 34. The inflowing coolant is thereby deflected through about 180°. Advantageously, the corresponding free end of inner tube 24 is rounded as shown at 35. A deflection gap 36, facilitating the flow, is thereby formed. The flow into inner tube 24 may further be improved, in this embodiment, by slightly flaring the free end thereof at the workpiece side. The end area of tube 24 thus has a larger diameter than the rest of the tube. By mounting inner tube 24 for displacement in the direction of double arrow 37, the width of deflection gap 36 can be varied and the coolant flow from annular space 26 into inner tube 24 can be controlled.

The front face 38 of outer tube 25 extends perpendicularly to the tube axis 39 and forms, at least partly, a resting surface for workpiece 3.

Outer tube 25 is concentrically surrounded by a trough-like channel 40 which can be covered by the workpiece. Channel 40 is supplied with liquid in a suitable way and the liquid returns, for example, through one or more bores 41 which, in this embodiment, are parallel to tube axis 39. Liquid channel 40 is completely filled so that the liquid surface reaches to the underside 20 of workpiece 3. To prevent an escape of the liquid in the radial direction, the outer wall 42 of channel 40 is partly formed by a seal ring 43, tightly applied against underside 20 of workpiece 3. The liquid in trough-like liquid channel 40 provides a satisfactory sound attenuation, so that the noise produced by the flame cutting process and also by the jet penetrating into coolant 23, cannot pass to the ambience or in any case is considerably reduced. If no separate supply line to liquid channel 40 is provided, the channel may advantageously be hydraulically connected to the supply line of cooling equipment 21. With the design of a coolant supply through annular space 26. preferably a hydraulic connection between this annular space 26 and liquid channel 40, will be provided. It is then particularly advantageous to provide a third tube 44 concentrically surrounding outer tube 25 of cooling equipment 21. A ring space 45 is thus formed between third tube 44 and outer tube 25 into which the coolant flows through a plurality of ports 46 preferably regularly spaced over the circumference. Ring space 45 communicates hydraulically with liquid channel 40 through an annular gap 47. If third tube 44 is mounted for displacement in the direction of double arrow 48, the width of annular gap 47 may be varied. From annular gap 47 the fluid flows around the front end edge of third tube 44. At the top, the gap is bounded by the underside 20 of workpiece 3. A common supply of liquid to the cooling equipment 21 and the liquid channel 40 has the advantage that only one line is needed. On the other hand, however, a separate supply line for liquid channel 40 may well serve the purpose if very different flow amounts are desired in liquid channel 40 and inner tube 24. In the same way as for inner tube 24, the liquid bores 41 may also be taken out by suction, by means of a pump or the like, however, this is useful only if, with a plurality of bores, the flow from the bores is initially collected in an annular channel (not shown) wherefrom a suction line leads to the pump.

As shown in FIG. 1, laterally of, and spaced from, flame cutter assembly 17, a punching or nibbling device 50 is provided. This permits the addition or alternate machining of the workpiece with cutting or nibbling tools. Such a punching, blanking or nibbling device may be of conventional design and no further showing or description are necessary. The coordinate guide system 2 would of course be used also for punching or nibbling and with an automatic control, the lateral spacing of the respective tools from the tube axis 39 must be taken into account in any program for machining the workpiece.

Figure 2B:
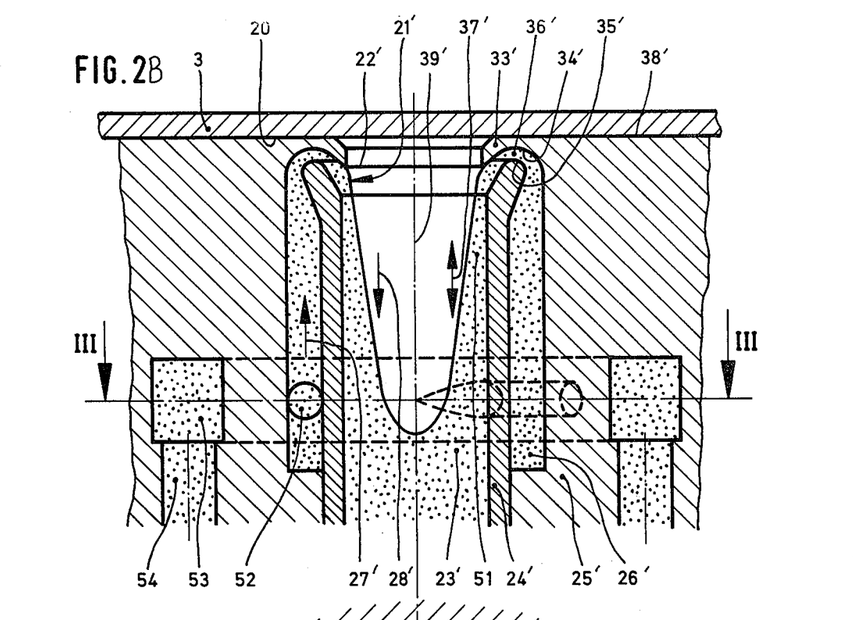
FIG. 2B is a partial radial section of another embodiment of the invention, taken in the zone of the cutting jet.
Figure 3:
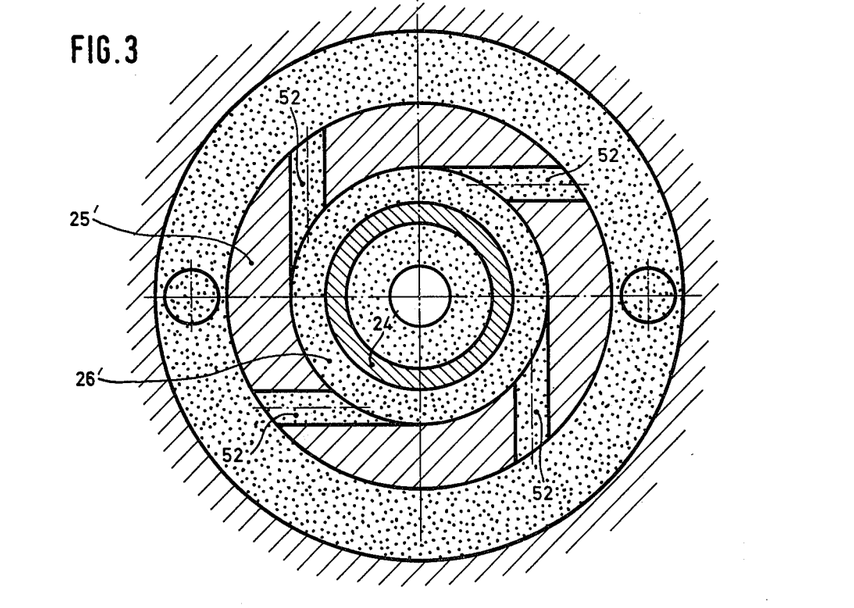
FIG. 3 is a sectional view taken along the line III—III of FIG. 2.

With reference to FIG. 2B and 3, instead of outer tube 25' with a corresponding bore or cavity may be provided. To simplify the description, however, only the term outer tube 25' is used in the following. Other parts that are similar to parts in FIG. 2A, are designated with like numerals having primes.

In this embodiment of the invention it is provided that a rotating wall 51 of cooling liquid forms in the interior of inner tube 24'. The rotary motion of the coolant is obtained as described hereinafter. The thickness of the coolant wall primarily depends on the width of an annular space or deflection gap 26'. It increases with the distance from entrance opening 22', with the speed of motion decreasing at the same time. In the lower part, the coolant fills the entire volume of inner tube 24'. The cutting jet with its particles and gases penetrates into the "eye" of this rotating coolant by which it is "swallowed." This cools the gases and the entrained material particles produced in the plasma jet cutting process, which are then removed at the lower end of the inner tube along with the coolant.

The rotary motion of the coolant wall is obtained in the shown embodiment by introducing the coolant into annular space 26' formed between the inner and outer tubes, through four supply parts uniformly distributed over their circumference. The supply ports extend in such direction that the coolant flows into this annular space substantially tangentially. Supply ports 52 extend from an annular channel 53 which is connected to supply line 54 leading from the coolant tank 30.

Figure 4:
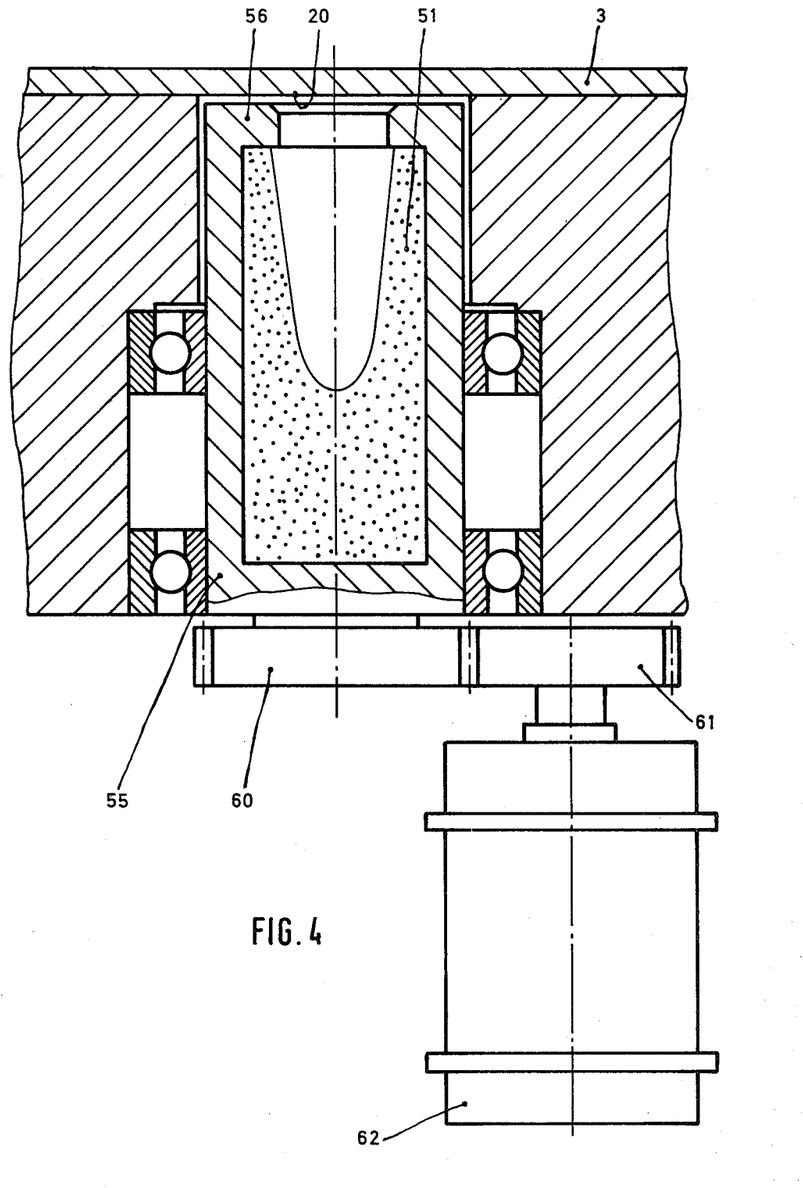
FIG. 4 is a longitudinal section similar to FIG. 2B of a third embodiment of the invention.

In another embodiment shown in FIG. 4, the coolant is received in the interior of a pot-shaped casing 55. The casing is set in motion by means of a motor 62 and two pinions 60, 61 for example. Due to the rotary motion, the coolant in casing 55 rises at the inner circumferential surface and forms a coolant 51. With increasing speed, the upper rim of the coolant wall approaches the rim 56 of the casing which advantageously is located close to the underside 20 of the workpiece. The coolant thus stays in casing 55 and may be periodically renewed.

Figure 5:
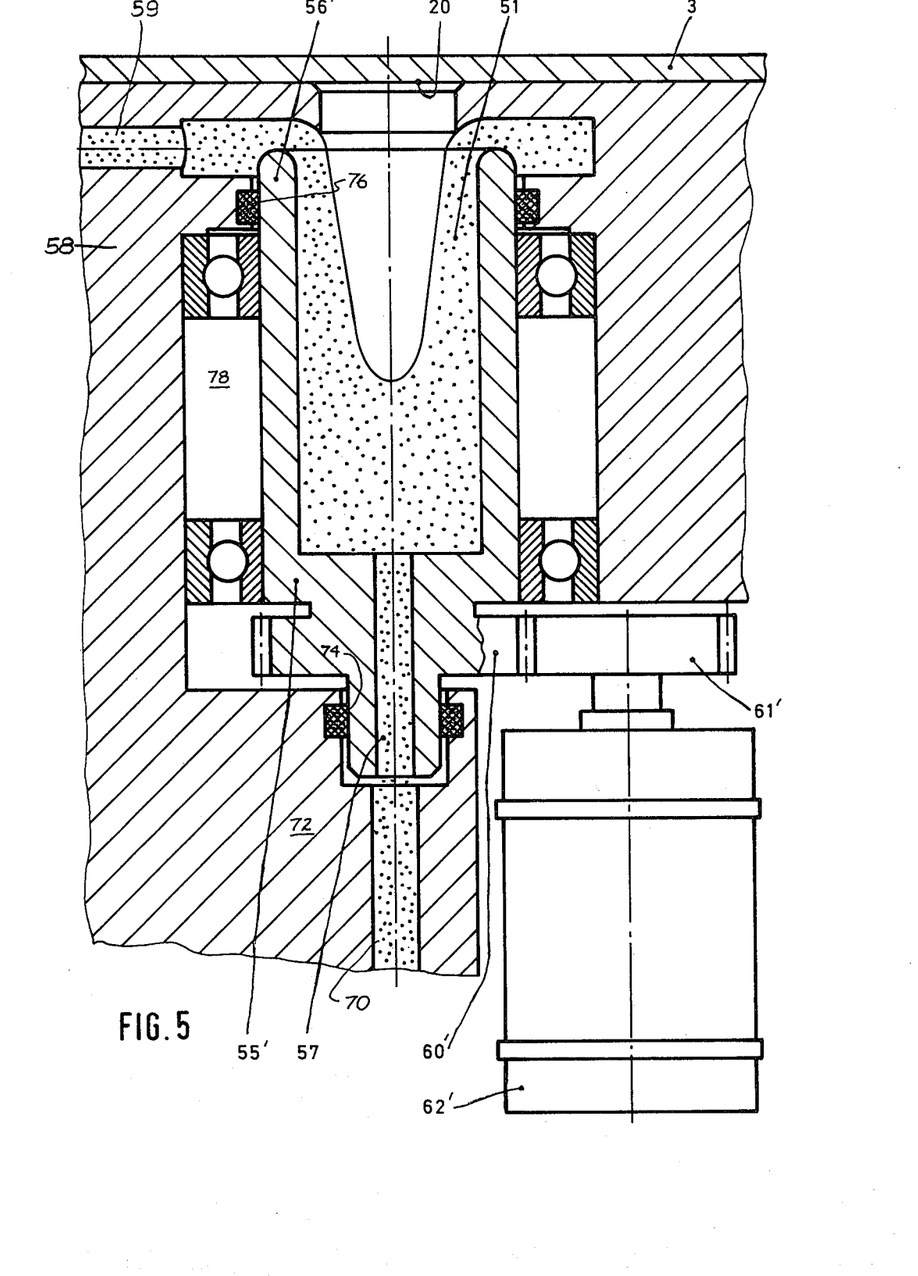
FIG. 5 is a view similar to FIG. 4 of a fourth embodiment.

In a still further embodiment shown in FIG. 5, the bottom of drivable casing 55' is provided with a central supply bore 57 for the cooling liquid. The casing is set in such rotation that the coolant flows over the rim 56'. The speed and the supplied coolant amount of course must be adjusted to keep the thickness of the coolant wall substantially constant at the various locations on the inside of casing 55'.

As a rule, an uncontrolled outflow of the coolant is not desirable, particularly if the coolant is not pure water and must therefore be prepared for recycling. That is why in this embodiment, the drivable casing 55' is surrounded by a tubular jacket 58 spaced apart therefrom and having an outlet connection 70 in its lower end portion. This lower end of the jacket is provided with an inwardly extending flange or collar 72 by which the space formed between the drivable casing and the jacket is closed. Because of the relative motion between the two parts, a seal 74 must be provided in the lower end portion of jacket 58. With a double jacket, as described above, a labyrinth-type packing may be provided in the zone of casing rim 56'. Liquid leaves over line 59 and a seal is used to prevent leakage into area 78 which house the bearings for casing 55'.

Figure 6:
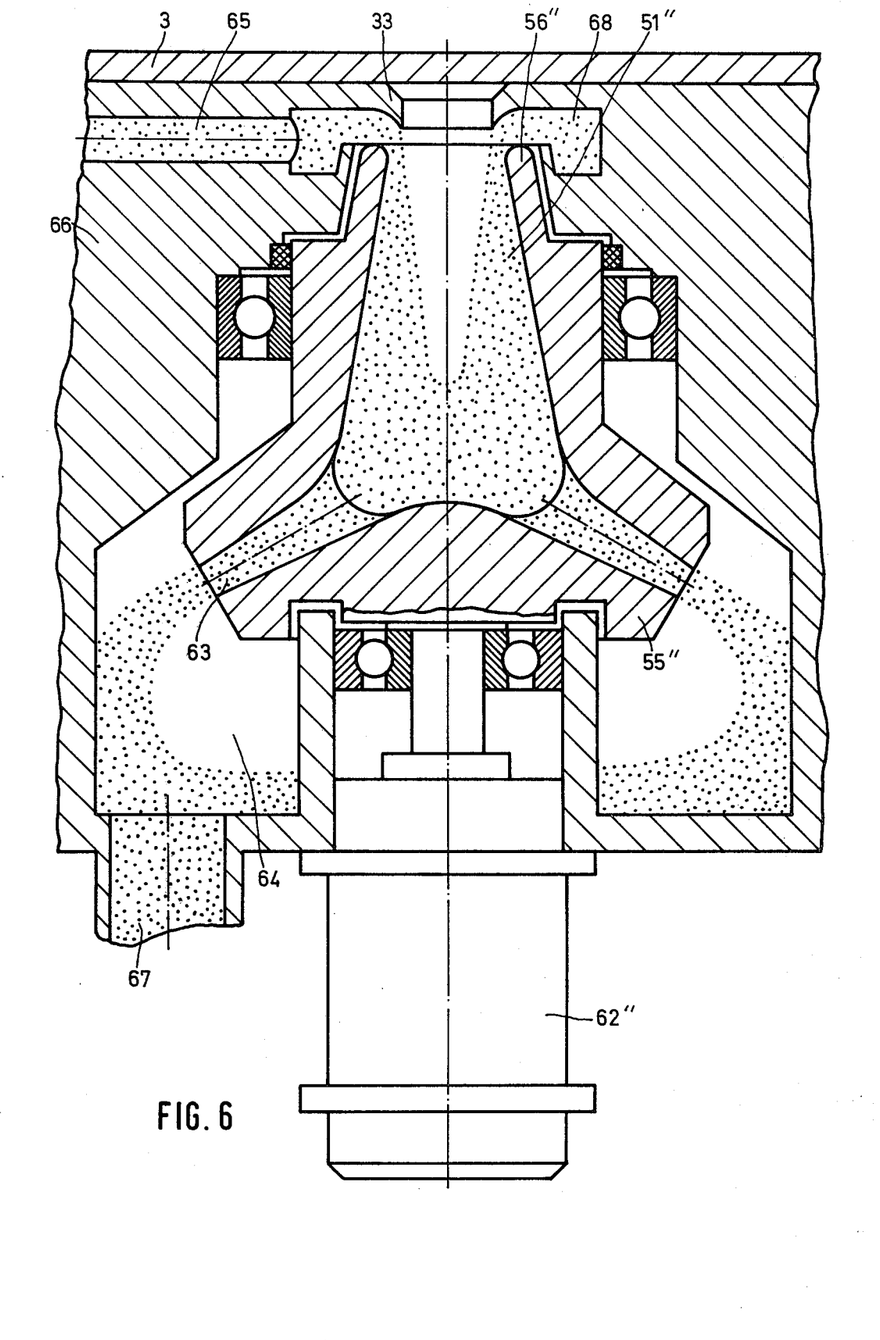
FIG. 6 is a similar view of a fifth embodiment of the invention.

According to another embodiment of the invention shown in FIG. 6, drivable casing 55" is provided in its lower part with a plurality of radial outlet ports 63 slanting downwardly to the outside, which, for example, may narrow toward their outlet. It is further provided in this embodiment that the inner surface of drivable casing 55" also converges, toward rim 56". Unlike the alternative design, according to FIG. 4, no inwardly extending flange or collar is provided in the embodiment of FIG. 6. The coolant is supplied to the interior of drivable casing 55" from the top, through a supply line 65 or a corresponding channel. To insure a uniform supply, it is very advantageous to introduce the coolant, through line 65 or a corresponding channel, initially into an annular space 68 provided above casing 55" and concentrical therewith. The outlet gap of this annular space, leading to the interior, is preferably downwardly curved, as shown in the drawing.

The fixed outer jacket 66 in which the mentioned annular space 68 is provided is further formed with a cavity 64 for collecting the coolant centrifuged from outlet ports 63. The coolant is collected in this cavity and drained through a diagrammatically shown outlet bore 67. After a proper treatment, especially purification and cooling, the coolant may be recycled through supply line 65.

FIG. 6 also shows an electric drive motor 62" and the two ball bearings for drivable casing 55". Unlike FIG. 5, where two pinions 60' and 61' are provided, no transmission is provided in the embodiment of FIG. 6.

While specific embodiments of the invention have been shown and described in detail to illustrate the application of the principles of the invention, it will be understood that the invention may be embodied otherwise without departing from such principles.

What is claimed is:

1. A machine for working flat workpieces comprising:
    a frame;
    a flame cutter connected to said frame for directing a cutting jet to one side of a workpiece which penetrates the workpiece;
    a mechanism connected to the frame for moving the workpiece past the cutting jet; and
    cooling equipment connected to the frame having an opening space facing said flame cutter for receiving the jet which has penetrated a workpiece, and having means for circulating a coolant in the opening space to receive the jet which has penetrated the workpiece.

2. A machine according to claim 1, wherein said cooling equipment includes:
    an outer casing having a bore therein; and
    an inner tube concentrically disposed in said outer casing bore, defining an annular space with said outer casing, said inner tube having an open end facing said flame cutter and a space therein communicating with said open end forming said opening space.

3. A machine according to claim 2, wherein said means for circulating a coolant is connected to supply coolant to one of said annular space and said opening space, and for receiving coolant from the other of said annular space and said open space.

4. A machine according to claim 3, wherein said outer casing includes an inwardly extending flange portion at an end of said outer casing bore facing said flame cutter, said flange portion extending over an end of said inner tube carrying said open end.

5. A machine according to claim 4, wherein said flange portion includes an inner curved contour and the open end of said inner tube has an outer curved contour for defining a deflection gap for coolant between said inner and outer curved contours.

6. A machine according to claim 5, wherein said inner curved contour of said flange portion is substantially a semicircular arc.

7. A machine according to claim 5, wherein a diameter of an opening formed by said flange portion is substantially equal to an inside diameter of said inner tube.

8. A machine according to claim 7, wherein said inner tube, at said open end flares outwardly toward said outer casing bore.

9. A machine according to claim 2, wherein said outer casing includes a surface facing said flame cutter which extends substantially perpendicularly to a major axis of said outer tube bore and said inner tube, said surface forming a support surface for the workpiece.

10. A machine according to claim 4, wherein said flange portion includes a surface facing said flame cutter extending substantially perpendicularly to a major axis of said inner tube and forming a support surface for a workpiece.

11. A machine according to claim 3, including a pressure pump for supplying coolant under pressure to said one of said annular space and open space, and a suction pump for drawing coolant from the other of said annular space and said open space.

12. A machine according to claim 2, wherein said outer casing comprises an outer tube.

13. A machine according to claim 12, wherein said means for circulating the coolant comprises a pressure pump connected to said annular space for suppling coolant thereto and a suction pump connected to said opening space of said inner tube for drawing coolant therefrom.

14. A machine according to claim 13, wherein said outer tube includes an inwardly extending flange portion extending over said inner tube open end, defining a deflection gap therebetween for deflecting coolant down into said opening space.

15. A machine according to claim 14, wherein an inner contour of said flange portion is substantially semicircular in arc.

16. A machine according to claim 15, wherein said inner tube flares outwardly toward said outer tube at said inner tube open end.

17. A machine according to claim 14, wherein at least one of said inner and outer tubes is mounted for axial displacement for changing the width of said deflection gap.

18. A machine according to claim 12, including means defining a liquid trough-channel concentrically surrounding said outer tube and facing said flame cutter which is adapted to be covered by a workpiece, and means defining a liquid inlet and a liquid outlet for supplying and receiving liquid to and from said liquid trough-channel.

19. A machine according to claim 18, wherein said liquid inlet is in hydraulic communication with said annular space between said inner and outer tubes, whereby said liquid trough-channel received coolant.

20. A machine according to claim 18, including a third concentric tube surrounding said outer tube and forming an inner wall of said liquid trough channel.

21. A machine according to claim 20, wherein said third tube is mounted for displacement, an end of said third tube forming a gap space which is in communication with said annular space between said inner and outer tubes which is varied in cross section area by movement of said third tube.

22. A machine according to claim 18, including a seal ring mounted adjacent an outer wall of said liquid trough-channel adapted to make sealing contact with a workpiece to close said liquid trough-channel.

23. A machine according to claim 18, including a suction connected to said liquid trough-channel outlet.

24. A machine according to claim 18, including a liquid tank connected to said liquid trough-channel outlet for receiving liquid therefrom.

25. A machine according to claim 18, wherein said liquid trough-channel inlet and outlet are connected to said means for circulating coolant to said open space for circulating coolant to said liquid trough-channel.

26. A machine according to claim 20, including a plurality of circumferentially spaced ports extending through said outer tube, said outer tube defining with said third tube a ring space communicating with said ports, said third tube defining with said outer tube an annular gap communicating with said ring space, said annular gap communicating with said liquid channel whereby coolant is supplied from said annular space between said inner and outer tubes, through said ports, said ring space and said annular gap, to said liquid trough-channel.

27. A machine according to claim 1, including an additional device connected to said frame spaced from said flame cutter for mechanically working the workpiece.

28. A machine according to claim 27, wherein said additional device comprises a punching device.

29. A machine according to claim 27, wherein said additional device comprises a nibbling device.

30. A machine according to claim 2, including means for producing a rotating coolant wall in said opening space, said coolant wall covering a substantial portion of said opening space for receiving said cutting jet.

31. A machine according to claim 30, wherein said means for producing a rotating coolant wall comprises said outer casing including at least one passage communicating with said annular space substantially tangentially to said annular space, said means for circulating coolant comprising means for supplying coolant to said passage, whereby a circular flow of coolant is established in said annular space which circular flow continues into said opening space to form said rotating coolant wall.

32. A machine according to claim 31, including said outer casing having an outer annular space defined therein connected to said passage.

33. A machine according to claim 31, wherein said outer casing includes an inwardly extending flange portion extending over the open end of said inner tube, defining with the open end of said inner tube a deflection gap.

34. A machine according to claim 33, wherein said inner tube is mounted for displacement to vary the cross-sectional area of said deflection gap.

35. A machine according to claim 1, including means for forming a rotating coolant wall in said opening space.

36. A machine according to claim 35, wherein said means for forming a rotating coolant wall comprises:
an outer casing having a bore therein;
an inner casing having an open end facing said flame cutter and forming said open end space, rotatably mounted in said outer casing bore; and
drive means connected to said inner casing for rotating said inner casing to form said rotating coolant wall in said opening space.

37. A machine according to claim 36, wherein said timer casing has a closed end opposite said open end for containing a supply of coolant.

38. A machine according to claim 37, wherein said inner casing includes an inwardly extending flange adjacent said inner casing open end for retaining the rotating coolant wall.

39. A machine according to claim 37, including a coolant passage in said closed bottom end of said inner casing, said outer casing including an annular space adjacent said open end of said inner casing, said means for circulating coolant comprising means for supplying coolant to one of said coolant passage and said annular space and for receiving coolant from the other of said coolant passage and annular space.

40. A machine according to claim 39, including a further coolant passage defined in said outer casing communicating with said coolant passage of said inner casing, a seal between said inner and outer casing adjacent the area of communication between said inner and outer casing coolant passages, and a seal between said inner and outer casings adjacent said annular space of said outer casing.

41. A machine according to claim 37, including a plurality of circumferentially spaced and substantially radially extending coolant passages extending out through said inner casing adjacent the closed bottom end thereof, said outer casing including an annular space positioned to receive coolant from said inner casing coolant passages.

42. A machine according to claim 41, wherein each of said passages tapers inwardly as it extends from said opening space.

43. A machine according to claim 41, wherein said opening space tapers inwardly toward said open end of said inner casing.

* * * * *